(12) United States Patent
Reshef et al.

(10) Patent No.: US 9,585,046 B2
(45) Date of Patent: Feb. 28, 2017

(54) SYSTEMS, METHODS, AND DEVICES FOR SOCIAL PROXIMITY FINE TIMING MEASUREMENT REQUESTS MULTICAST SIGNALING

(71) Applicants: Ehud Reshef, Kiryat Tivon (IL); Jonathan Segev, Tel Mond (IL); Ofer Hareuveni, Haifa (IL); Elad Oren, Tel Aviv (IL)

(72) Inventors: Ehud Reshef, Kiryat Tivon (IL); Jonathan Segev, Tel Mond (IL); Ofer Hareuveni, Haifa (IL); Elad Oren, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 89 days.

(21) Appl. No.: 14/496,993

(22) Filed: Sep. 25, 2014

(65) Prior Publication Data
US 2016/0021560 A1    Jan. 21, 2016

Related U.S. Application Data

(60) Provisional application No. 62/025,890, filed on Jul. 17, 2014.

(51) Int. Cl.
*H04W 24/10*    (2009.01)
*H04W 84/12*    (2009.01)
*H04L 12/26*    (2006.01)
*G01S 19/25*    (2010.01)
*H04W 64/00*    (2009.01)

(52) U.S. Cl.
CPC .......... *H04W 24/10* (2013.01); *H04L 43/0864* (2013.01); *H04W 84/12* (2013.01); *G01S 19/256* (2013.01); *H04W 64/00* (2013.01); *Y02B 60/50* (2013.01)

(58) Field of Classification Search
CPC .... H04L 43/0864; H04W 64/00; G01S 19/256
See application file for complete search history.

(56) References Cited

U.S. PATENT DOCUMENTS

| | | | |
|---|---|---|---|
| 2015/0139213 A1* | 5/2015 | Abraham | H04L 69/28 370/338 |
| 2015/0350027 A1* | 12/2015 | Raissinia | H04L 41/12 455/517 |
| 2015/0350936 A1* | 12/2015 | Qi | H04W 24/06 370/252 |
| 2015/0365835 A1* | 12/2015 | Segev | H04W 48/16 370/252 |

\* cited by examiner

*Primary Examiner* — Jianye Wu
(74) *Attorney, Agent, or Firm* — Sutherland Asbill & Brennan LLP (57) ABSTRACT

Embodiments relating to systems, methods, and devices for social proximity fine timing measurement requests (FTMR) multicast signaling between mobile devices are disclosed. Example embodiments generally relate to Wi-Fi networks, IEEE 802.11x, Social Wi-Fi networks and Neighbor-Awareness Networking (NAN).

18 Claims, 6 Drawing Sheets

SYSTEMS, METHODS, AND DEVICES FOR SOCIAL PROXIMITY FINE TIMING MEASUREMENT REQUESTS MULTICAST SIGNALING

CROSS REFERENCE TO RELATED APPLICATION

This application claims the benefit of U.S. provisional Patent Application Ser. No. 62/025,890, filed on Jul. 17, 2014, the disclosure of which is incorporated herein by reference.

TECHNICAL FIELD

The present disclosure generally relates to Wi-Fi networks, IEEE 802.11x, Social Wi-Fi networks and Neighbor-Awareness Networkings (NANs).

BACKGROUND

Advances in technology have resulted in smaller and more powerful computing devices. For example, there currently exist a variety of portable personal computing devices, including wireless computing devices, such as portable wireless telephones, personal digital assistants (PDAs), wearable computer devices, and paging devices that are small, lightweight, and easily carried by users. More specifically, portable wireless telephones, such as cellular telephones and internet protocol (IP) telephones, can communicate voice and data packets over wireless networks. Further, many such wireless telephones can include other types of devices that may be incorporated in the wireless telephones. For example, a wireless telephone can also include a digital still camera, a digital video camera, a digital audio recorder, and an audio file player. Also, such wireless telephones can process instructions, such as a web browser application that can be used to access the Internet. Memories, such as a memory within a wireless telephone or other electronic device, may store instructions in addition to other data.

As wireless devices become less expensive and more common, networks can experience increased traffic, potentially burdening the networks, slowing performance of the wireless devices, and frustrating users. Accordingly, network setup and network resource allocation (e.g., how traffic is routed within the network) can be relatively important considerations in designing and implementing wireless devices and wireless networks.

Global navigation satellite systems (GNSSs), such as the global positioning system (GPS) and other like satellite positioning systems have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the request message.

SUMMARY

Embodiments of the disclosure relate to systems, methods, and devices for social proximity fine timing measurement requests (FTMR) multicasting signaling. Certain embodiments can provide secure and power-efficient proximity-based services (e.g., a Neighbor-Awareness Networking (NAN)). These techniques may reduce burdens on "centralized" communication devices, such as access points (APs) and base stations, by enabling "direct" communication between mobile devices.

In one example embodiment, a system for communicating between two or more devices, the system can include a first device configured to identify one or more other devices that would like to measure proximity to the first device by transmitting one or more fine timing measurement (FTM) requests, the first device transmitting a service discovery frame (SDF) indicating an intent to respond to the one or more fine timing measurement (FTM) requests, wherein the first device and one or more other devices satisfying the service discovery frame move to a channel requested by the first device to perform FTM flow, and the one or more other devices transmit respective FTM frames to the first device.

In another example embodiment, a method for communication between two or more devices, the method can include the operations of identifying, by a first device, one or more other devices that would like to measure proximity to the first device by transmitting one or more fine timing measurement (FTM) requests, transmitting, by the first device, a service discovery frame (SDF) indicating an intent to respond to the one or more fine timing measurement (FTM) requests, transitioning, by the first device and one or more other devices satisfying the service discovery frame, to a channel requested by the first device to perform a FTM flow, and transmitting, by the one or more other devices, respective FTM frames to the first device.

In another example embodiment, a device can include a non-transitory computer readable storage device including stored instructions. The instructions can be executed by one or more processor(s), and cause the device to perform operations of identifying one or more other devices that would like to measure proximity to the device by transmitting one or more fine timing measurement (FTM) requests, transmitting, by a wireless controller coupled to the one or more processor(s), a service discovery frame (SDF) indicating an intent to respond to the one or more fine timing measurement (FTM) requests, and transitioning, by the device and one or more other devices satisfying the service discovery frame, to a channel requested by the device to perform a FTM flow.

In another example embodiment, a non-transitory computer readable storage device including stored instructions. The instructions can be executed by one or more processor(s) of a first mobile device, and cause the first mobile device to perform operations of identifying one or more other mobile devices that would like to measure proximity to the first mobile device by transmitting one or more fine timing measurement (FTM) requests, transmitting a service discovery frame (SDF) indicating an intent to respond to the one or more fine timing measurement (FTM) requests, and transitioning, by the first mobile device and one or more other mobile devices satisfying the service discovery frame, to a channel requested by the first mobile device to perform a FTM flow.

Other embodiments, aspects, and features of the present disclosure will become apparent after review of the entire application, including the following sections: Brief Description of the Drawings, Detailed Description, and the Claims.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The terms "communication station", "station", "handheld device", "mobile device", "wireless device" and "user equipment" (UE), as used herein, refers to a wireless communication device such as a cellular telephone, smartphone, tablet, netbook, wireless terminal, laptop computer, a wearable computer device, a femtocell, High Data Rate (HDR) subscriber station, access point, access terminal, or other personal communication system (PCS) device. The device may be either mobile or stationary. The term "access point" (AP) as used herein may be a fixed station. An access point may also be referred to as an access node, a base station or some other similar terminology known in the art. An access terminal may also be called a mobile station, a user equipment (UE), a wireless communication device or some other similar terminology known in the art.

Embodiments of the disclosure provide numerous technical effects and unobvious solutions over conventional methods. For example, one or more example embodiments discussed herein relate to systems, methods, and devices for social proximity fine timing measurement request (FTMR) multicast signaling between one or more mobile devices and one or more APs. The present disclosure generally relates to Wi-Fi networks, IEEE 802.11x, social Wi-Fi networks and Neighbor-Awareness Networking (NAN), and the likes.

Figure 1:
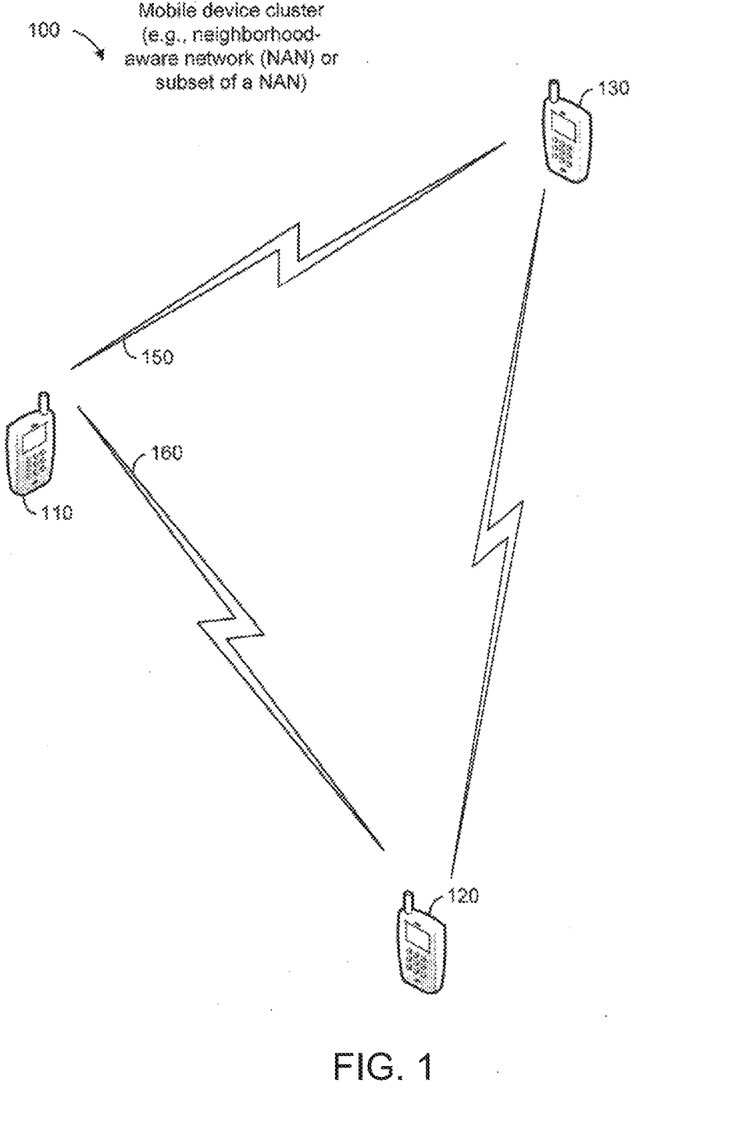
FIG. 1 depicts an illustrative example of a mobile device cluster, according to one or more embodiments of the present disclosure.

Referring to FIG. 1, an example illustrative embodiment of a mobile device cluster is depicted and generally designated 100. The mobile device cluster 100 can include a first mobile device 110, a second mobile device 120, and a third mobile device 130. In at least one embodiment, the mobile device cluster 100 can use Neighbor-Awareness Networking (NAN) protocols or can be a subset of a NAN cluster.

Although the mobile device cluster 100 is illustrated as including three mobile devices in FIG. 1, the mobile device cluster 100 may include more than three devices or fewer than three devices. The mobile devices of the mobile device cluster 100 may be configured to communicate wirelessly according to one or more wireless communication protocols. For example, the mobile devices (e.g., the mobile devices 110, 120, 130) of the mobile device cluster 100 may send and receive discovery messages, such as beacons in connection with an Institute of Electrical and Electronics Engineers (IEEE) 802.11 or Wi-Fi Alliance protocol. In this context, a protocol refers to parameters used to communicate, such as a channel on which communications occur, timing of communications (e.g., timing of discovery intervals), etc. In another example, the mobile devices of the mobile device cluster 100 may also communicate data, such as data associated with a particular application that is common to each mobile device of the mobile device cluster 100.

In the particular embodiment depicted in FIG. 1, the first mobile device 110 may send a discovery message 150. The discovery message 150 may be sent during a time interval associated with advertisement of the mobile device cluster 100 to potential members of the mobile device cluster 100, such as a discovery interval. The discovery message 150 can indicate a post-discovery communication technique or protocol for communicating within the mobile device cluster 100 after the discovery interval. The discovery message 150 may be a beacon in connection with an IEEE 802.11 protocol.

In the particular example of FIG. 1, the second mobile device 120 can receive the discovery message 150 from the first mobile device 110. The second mobile device 120 may send a response 160 after the discovery interval (e.g., at a time associated with post-discovery communications). The response 160 can be sent using the post discovery communication protocol and in response to receiving the discovery message 150.

The post discovery communication protocol may be associated with a particular application that is common to the mobile devices of the mobile device cluster 100. For example, the post discovery communication protocol may include a Wi-Fi Direct communication technique, an always-on association communication technique, a public frame communication technique, another communication technique, or a combination thereof.

When the discovery message 150 indicates that the post discovery communication protocol is a Wi-Fi Direct technique, the discovery message 150 may also include information that can be used by the second mobile device 120 to establish a connection to the first mobile device 110 using the Wi-Fi Direct technique. For example, the discovery message 150 may indicate that the first mobile device 110 is a Wi-Fi Direct group owner (GO). In another example, the discovery message 150 may indicate a time when the first mobile device 110 will be on (e.g., not in a low power or sleep state) to receive association requests. Thus, in response to the discovery message 150, the second mobile device 120, may send an association request associated with the Wi-Fi Direct technique to the first mobile device 110 at the time when the first mobile device 110 will be on to receive association requests.

A public frame technique refers to a communication technique that uses public frames, such as generic advertisement service (GAS) frames. By using public frames, no association requests may be needed. Thus, in response to the discovery message 150 indicating that the post discovery communication technique is a public frame technique, the second mobile device 120 may send information or requests to the first mobile device 110 using public frames without first establishing an association with the first mobile device 110.

An always-on association technique refers to a communication technique in which a mobile device that has a particular application (such as a gaming application or a social-networking application) is preconfigured to communicate with other mobile devices that have the same particular application. For example, communication parameters, such as MAC addresses, timing information, encryption information, etc. may be stored in a memory of the second mobile device 120. When the second mobile device 120 receives the discovery message 150 and the discovery message indicates that the post-discovery communication technique is an always-on association technique associated with a particular application, the second mobile device 120 may access data associated with the first mobile device 110 and the particular application from a memory of the second mobile device 120. By using the always-on association technique, no association requests may be needed because information communicated via association requests and responses is already stored on devices that have the particular application. Thus, in response to the discovery message 150 indicating that the post discovery communication technique is an always-on association technique, the second mobile device 120 may send information or requests to the first mobile device 110 using information from a memory of the second mobile device 120.

Accordingly, in at least one embodiment, a method can include determining, at a first mobile device (e.g., at one of the mobile devices 110, 120, 130), a post-discovery communication protocol for communicating within a mobile device cluster (e.g., the mobile device cluster 100) after a discovery interval. The method can further include sending, during the discovery interval, a discovery message (e.g., the discovery message 150) indicating the post-discovery communication protocol for communicating within the mobile device cluster after the discovery interval.

In at least another particular embodiment, a method can include receiving, during a discovery interval and by a first mobile device (e.g., at one of the mobile devices 110, 120, 130) a discovery message (e.g., the discovery message 150) from a second mobile device (e.g., from another of the mobile devices 110, 120, 130). The discovery message can indicate a post-discovery communication technique for communicating within a mobile device cluster (e.g., the mobile device cluster 100) after the discovery interval. In response to the discovery message and after the discovery interval, a response the response 160) can be sent to the second mobile device using the post-discovery communication technique.

Certain technical effects or solutions can be accomplished by certain embodiments of the disclosure, for example, it will be appreciated that communication according to the example mobile device cluster 100 of FIG. 1 may enable relatively efficient discovery of mobile device clusters and potential members of mobile device clusters. For example, as described further with reference to FIGS. 2-5, because the discovery message 150 of FIG. 1 indicates a post-discovery communication protocol for communicating after the discovery interval, direct communication between devices of a mobile device cluster (e.g., the mobile device cluster 100) can be simplified, therefore potentially saving power consumption and processing resources.

The Wi-Fi Alliance is currently in development of two different certifications, which make use of IEEE 802.11 REVmc fine timing measurement (FTM) procedure: (1) Wi-Fi Location certification—addressing indoor location and indoor navigation, as part of the wireless network management (WNM) set of capabilities, and (2) Neighbor Awareness Networking (NAN) certification—addressing low power device and service discovery over Wi-Fi.

According to one or more example embodiments, the FTM procedure may be used in indoor navigation, where a client device may locate itself by measuring range to multiple APs with a known location deployed over multiple operating channels, for example.

According to one or more example embodiments, social use cases supported by NAN may be quite different from the location usage model. For example, NAN clients may be expected to be power conscious devices, where client interaction is pending (1) application/service match, and/or (2) proximity requirement matching. The NAN protocol may be operative to perform service discovery, where a following FTM flow can be used to determine proximity, for example.

These operating conditions for NAN may allow optimizing FTM medium usage efficiency, for example. However, the negotiation phases may still need a minimum of two messages per NAN device pair. Assuming a relatively large number of NAN devices are interested in performing proximity measurements, which may result in an increased medium usage and extended off NAN channel operation, the systems, methods, and devices of the present disclosure can move from a set of dedicated FTM flows following the NAN discovery to a multi-device 1:N FTM flow. By doing so they can improve the medium usage and power consumption associated with the FTM procedure, for example.

Figure 2:
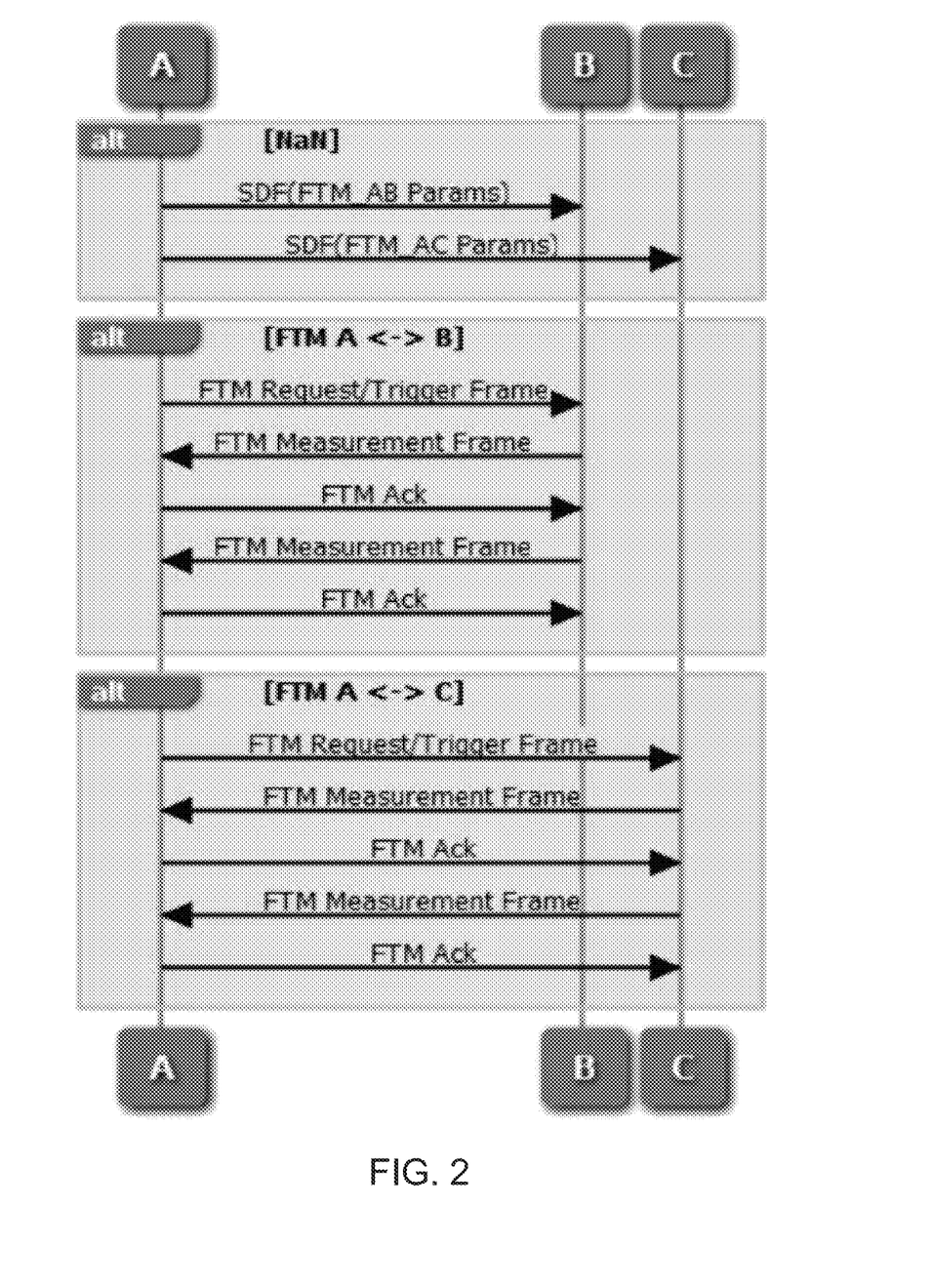
FIG. 2 depicts an illustrative example of a legacy FTM flow following NAN.

Turning now to FIG. 2, an example of a legacy fine timing measurement (FTM) flow following NAN is provided according one or more embodiments of the present disclosure. According to one or more example process flows, once a device finds, through NAN, a set of peers that would like to know their distance to that device, it can send one or more dedicated NAN service discovery frames (SDF) with a specific channel, time, and target peers, and initiate one or more FTM flows at the advertised channels and times, as illustrated in FIG. 2, for example.

Certain technical effects or solutions can be accomplished by certain embodiments of the disclosure, for example, one or more example embodiments can relate to a low power service discovery (LPSD) method that may focus on the baseline capability of connecting devices with similar/relevant "intent" in a given proximity. Example systems, methods, and devices of the present disclosure may further add distance/proximity awareness for this discovery, allowing for better usability, further taking into account power consumption and air time usage optimizations. According to one example embodiment, in the expected "trivial" flow, the requesting device may need to request the proximity measurements per target device as well as initiate the actual FTM flow per target device, as illustrated in FIG. 2, for example.

Figure 3:
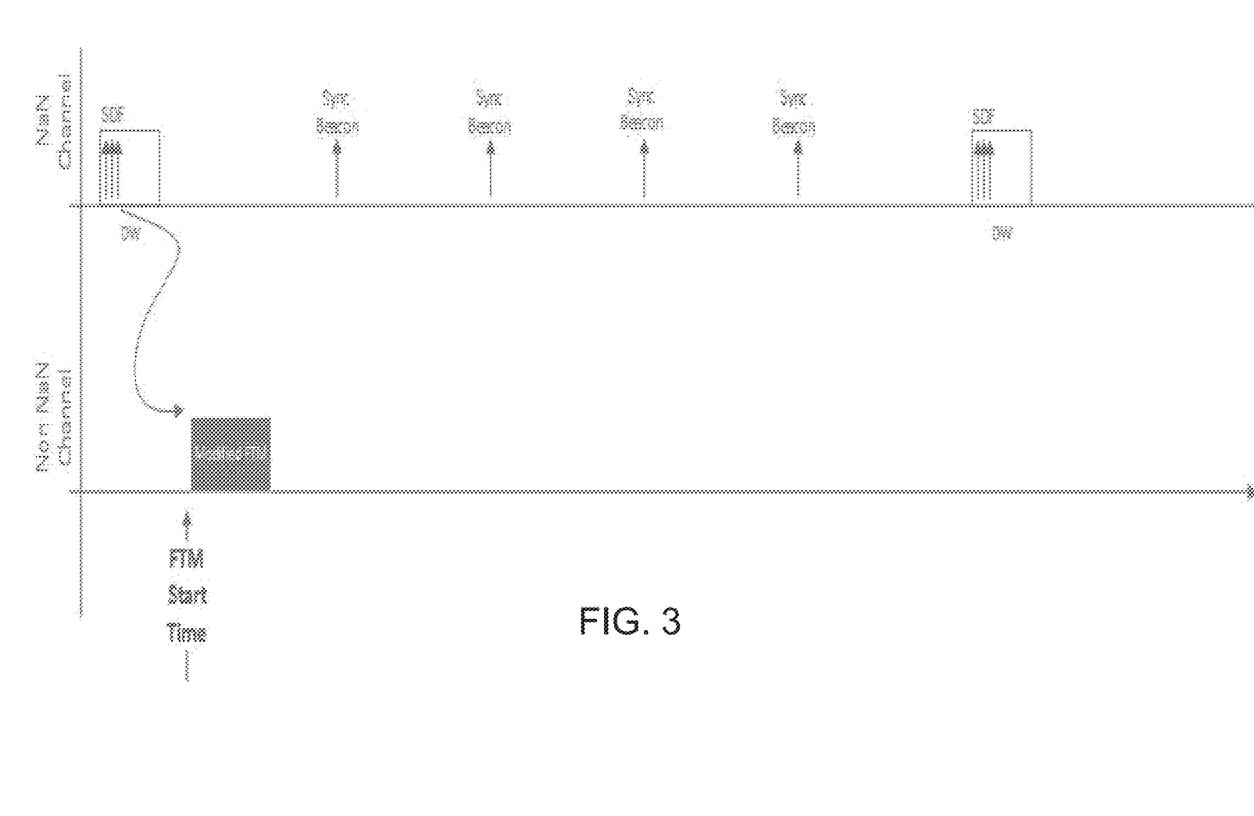
FIG. 3 depicts an illustrative example method of operation of one or more of the mobile devices of FIG. 1, according to one or more embodiments of the present disclosure.
Figure 4:
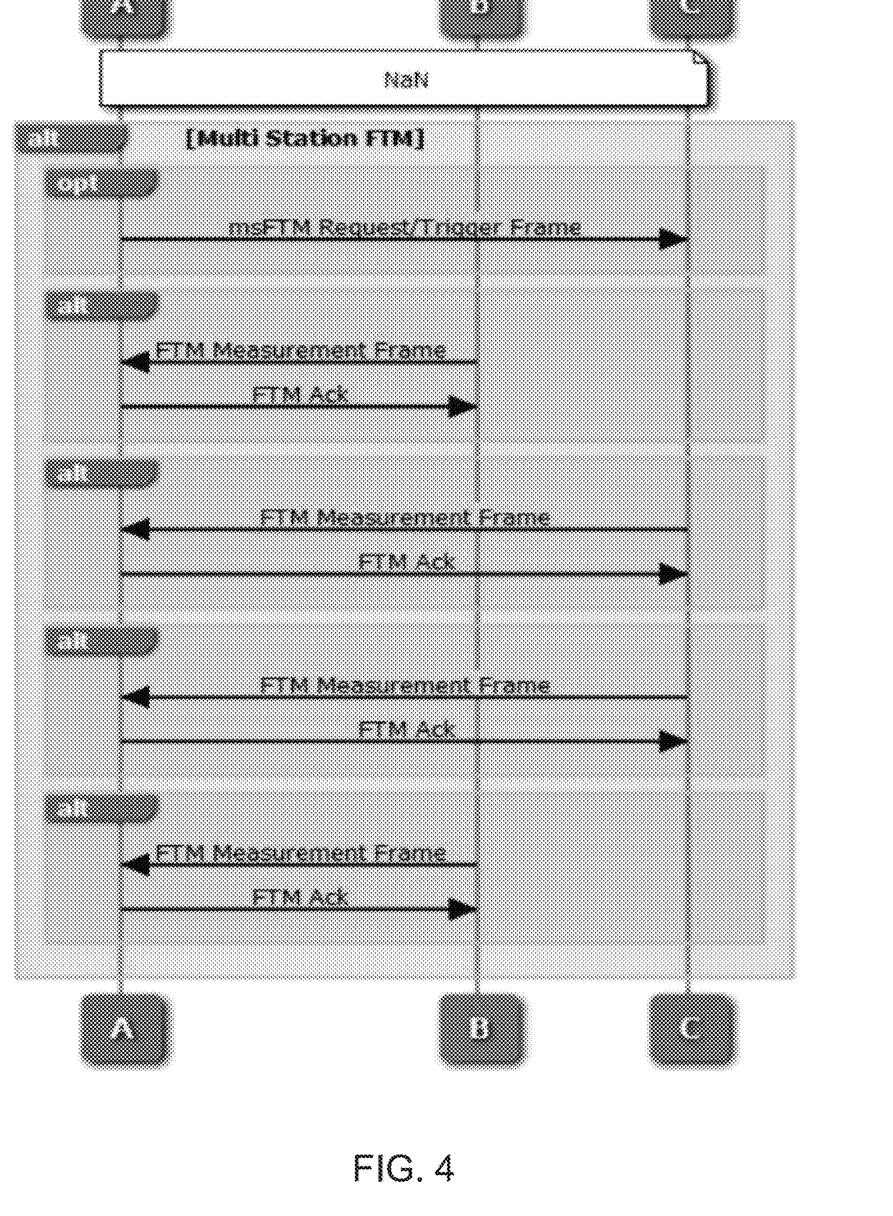
FIG. 4 depicts an illustrative example multi-station FTM flow, according to one or more embodiments of the present disclosure.

The example systems, methods, and devices according one or more embodiments of the present disclosure can (1) efficiently unify multiple NAN SDFs requesting the proximity measurements into a single SDF frame, potentially also triggering the FTM sequence, and (2) remove the need for a dedicated FTM Request frame per peer device. These optimizations can reduce channel use, for example, number and length of messages sent over the air, and the resulting power consumption for all the devices involved in the interaction. Example flow and timing diagrams are illustrated in FIGS. 3 and 4 of the present disclosure, for example.

According to one or more example process flows, a NAN device "A" can find, by listening to NAN discovery windows, a set of other NAN devices, here shown as "B", "C" (but any number of such devices may be feasible) that would like to measure their proximity to device "A". Following the initial NAN discovery, device "A" (the requesting device) may transmit a NAN SDF indicating the intent to respond to multiple FTM requests.

The NAN SDF broadcasting this request may include information, such as for example, a channel to perform FTM in, and a time and/or duration of FTM window, for example. If the device wants to limit the set of target devices for FTM, it can publish a set of target NAN Devices for FTM, for example.

Further, in case the device wants to measure its own proximity to other devices, it can also publish a "role" of "initiator". The device, and all other devices that fit the information in the transmitted NAN SDF can then, at the requested time, move to the requested channel to perform the FTM flow as shown in FIG. 3, for example.

In the "modified FTM" window, according to one or more example embodiments, the appropriate devices that can measure their proximity to the responder can then use standard Wi-Fi CS/MA techniques to initiate FTM measurements frames towards station "A" (the requesting device). The responder in this case shall act as a responding device, for example. In the case where "A" is the NAN device that requested the flow, the stations B, C, can directly contend to send the FTM measurement frames. However, in the case where station "A" is not the requesting NAN device, at least one station needs send an FTM request/trigger frame, shown in FIG. 4 as msFTM request, for example, to initiate the FTM flow. In this trigger frame, for example, station "A" may limit the set of stations that may send FTM measurement frames, for example, by sending a list of service set IDs (SSIDs), medium access controller (MAC) addresses, NAN device IDs, the originating NAN cluster basic service set ID (BSSID), etc. While it may be feasible to send an "any station" ID in the FTM Trigger frame, it is expected that such may not be used due to the possible implications of "unknown"/"unwanted" stations also sending FTM measurement frames as a result.

Certain technical effects or solutions can be accomplished by certain embodiments of the disclosure, for example, the example embodiments of the present disclosure may result in, for example, reduced over the air operation, resulting with higher overall network capacity, and reduced device power consumption.

Figure 6:
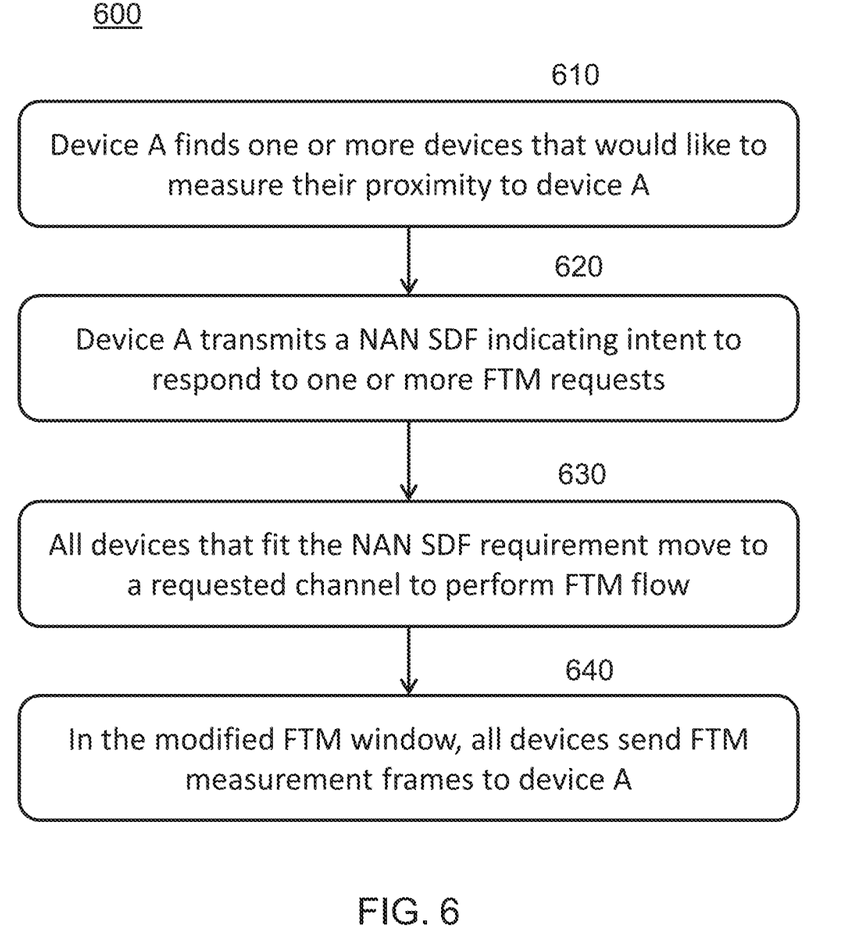
FIG. 6 depicts an illustrative process flow diagram of an example method of communication between two or more devices, according to one or more embodiments of the present disclosure.

One or more example embodiments can relate to a method 600 for communicating between two or more mobile devices, as illustrated in FIG. 6. As illustrated in this example process flow diagram, in operation 610, a first NAN device "A" can find, by listening to NAN discovery windows, a set of other NAN devices, here shown as "B", "C" (but any number of such devices may be feasible) that would like to measure their proximity to device "A". Following the initial NAN discovery, in operation 620, device "A" (the requesting device) may transmit a NAN SDF indicating the intent to respond to multiple FTM requests.

The NAN SDF broadcasting this request may include information, such as for example, a channel to perform FTM in, and a time and/or duration of FTM window, for example. If the device wants to limit the set of target devices for FTM, it can publish a set of target NAN Devices for FTM, for example.

Further, in case the device wants to measure its own proximity to other devices, it can also publish a "role" of "initiator," for example. In operation 630, the device "A," and all other devices that fit the information in the transmitted NAN SDF can then, at the requested time, move to the requested channel to perform the example FTM flow as shown in FIG. 3.

In operation 640, in the "modified FTM" window, the appropriate devices that can measure their proximity to the responder, and can then use standard Wi-Fi CS/MA techniques to initiate FTM measurements frames towards station "A" (the requesting device). The responder in this case shall act as a responding device, for example. In the case where "A" is the NAN device that requested the flow, the stations B, C, can directly contend to send the FTM measurement frames. However, in the case where station "A" is not the requesting NAN device, at least one station needs send an FTM request/trigger frame, shown in FIG. 4 as msFTM request, for example, to initiate the FTM flow. In this trigger frame, for example, station "A" may limit the set of stations that may send FTM measurement frames, for example, by sending a list of service set IDs (SSIDs), medium access controller (MAC) addresses, NAN device IDs, the originating NAN cluster basic service set ID (BSSID), etc. It should be appreciated that the above examples of technical effects and/or solutions of the present disclosure are merely illustrative and that numerous other technical effects and/or solutions may exist.

Figure 5:
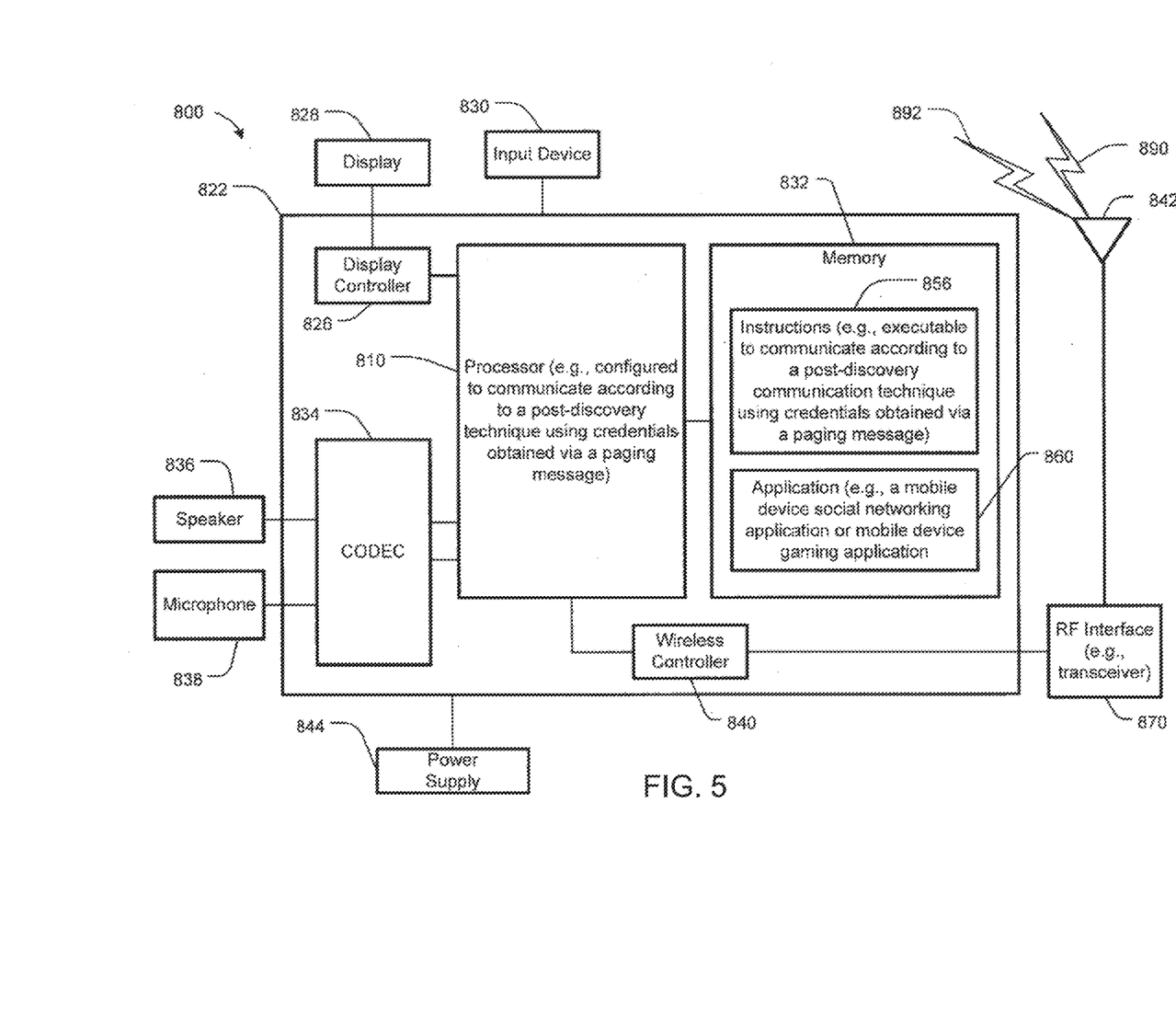
FIG. 5 depicts a schematic diagram illustrating example device architecture of a mobile device, according to one or more embodiments of the present disclosure.

Referring to FIG. 5, a block diagram of a particular illustrative embodiment of one or more of the mobile devices described with reference to FIGS. 1-4, such as any of the mobile devices 110, 120, 130 of FIG. 1, is depicted and generally designated 800. The example mobile device 800 can include a processor 810 and at least one non-transitory computer-readable medium (e.g., a memory 832) coupled to the processor. The memory 832 may include instructions 856 executable by the processor 810.

The processor 810 may be further configured to or may execute the instructions 856 to communicate according to a post discovery technique (e.g., a Wi-Fi Direct technique) using credentials (e.g., a passphrase, encryption/decryption keys, or a combination thereof) obtained via a paging message (e.g., a paging request, a paging response, or a combination thereof). For example, in a particular embodiment, the processor 810 can execute the instructions 856 to perform one or more operations described in reference to the method 400 of FIG. 4, for example.

The processor 810 may further be configured to or may execute the instructions 856 to determine a post-discovery communication protocol for communicating within a mobile device cluster after a discovery interval and to send, during the discovery interval, a discovery message 890 indicating the post-discovery communication technique for communicating within the mobile device cluster after the discovery interval. The discovery message 890 may correspond to the discovery message 150 of FIG. 1, for example.

The processor 810 may be configured to or may execute the instructions 856 to receive, during a discovery interval, a discovery message 892 from a second mobile device (e.g., another of the mobile devices 110, 120, 130). The discovery message 892 can indicate a post-discovery communication protocol for communicating within a mobile device cluster (e.g., the mobile device cluster 100) after the discovery interval. The processor 810 may be further configured to or may execute the instructions 856 to send a response (e.g., the response 160) to the second mobile device using the post-discovery communication protocol. The discovery message 892 of FIG. 5 may correspond to the discovery message 150 of FIG. 1, for example.

The memory 832 may store additional instructions, data, or a combination thereof. For example, the memory 832 may store an application 860. In a particular illustrative embodiment, the application 860 may be a common application shared or run by each device of a mobile device cluster, such as the mobile device cluster 100. The application 860 may be a mobile device social networking application, a mobile device gaming application, or a combination thereof. The memory 832 may store information related to Wi-Fi communication between mobile devices, such as information related to a Wi-Fi Direct communication technique, such as a communication channel for Wi-Fi Direct communication indicated by a discovery message. When a post discovery communication technique in accordance with an embodiment of the present disclosure is an always-on association technique, the memory 832 may include communication parameters associated with one or more other mobile communication devices that use the always-on association technique, such as other devices that include the application 860.

Alternatively or in addition, the memory 832 may store information related to one or more predetermined communication techniques associated with the application 860 and further associated with the mobile device cluster. For example, in at least one embodiment, each mobile device of the mobile device cluster stores (e.g., is initially "provisioned" with) indications of the one or more predetermined communication techniques. Further, the memory 832 may store association parameters associated with association between mobile devices of the mobile device cluster. For example, the memory 832 may store device capabilities associated with one or more mobile devices of the mobile device cluster (e.g., whether a particular mobile device of the mobile device cluster utilizes a single-antenna or a multiple-antenna structure, other device capabilities, or a combination thereof). In at least one embodiment, because each of the mobile devices stores such indications of the one or more predetermined communication techniques and the association parameters, post-discovery communication may be simplified.

Alternatively or in addition, the memory 832 may store information related to public frame or public action frame (PAF)-based communication techniques, such as information related to generic advertisement service (GAS) frames. Using the PAF-based communication techniques may reduce or avoid post-discovery connection setup by using "generic" frames, thus potentially simplifying communication within the mobile device cluster.

FIG. 5 also shows a display controller 826 that is coupled to the processor 810 and to a display 828. A coder/decoder (CODEC) 834 can also be coupled to the processor 810. A speaker 836 and a microphone 838 can be coupled to the CODEC 834. FIG. 5 also indicates that a wireless controller 840 can be coupled to the processor 810, to a radio frequency (RF) interface 870 (e.g., a transceiver), and to a wireless antenna 842. Wireless controller 840 may be configured to transmit, through the RF interface, for example, one or more service discovery frames (SDF) indicating an intent to respond to the one or more fine timing measurement (FTM) requests, as described above in one or more example embodiments.

In a particular embodiment, the processor 810, the display controller 826, the memory 832, the CODEC 834, and the wireless controller 840 can be included in a system-in-package or system-on-chip device 822. In a particular embodiment, an input device 830 and a power supply 844 are coupled to the system-on-chip device 822. Moreover, in a particular embodiment, as illustrated in FIG. 5, the display 828, the input device 830, the speaker 836, the microphone 838, the RF interface 870, the wireless antenna 842, and the power supply 844 are external to the system-on-chip device 822. However, each of the display 828, the input device 830, the speaker 836, the microphone 838, the RF interface 870, the wireless antenna 842, and the power supply 844 can be coupled to a component of the system-on-chip device 822, such as an interface or a controller.

In addition, various illustrative logical blocks, configurations, modules, circuits, and algorithm operations described in connection with the embodiments of the present disclosure may be implemented as electronic hardware, computer software, or combinations of both. Various illustrative components, blocks, configurations, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The operations of a method or algorithm described in connection with the embodiments of the present disclosure may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The processor executable instructions may further be transmitted or received over a communications network using a transmission medium via the network interface device/transceiver utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver may include one or more physical jacks (e.g., Ethernet, coaxial, or phone jacks) or one or more antennas to connect to the communications network. In an example, the network interface device/transceiver may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine, and includes digital or analog communications signals or other intangible media to facilitate communication of such software.

While there have been shown, described and pointed out, fundamental novel features of the present disclosure as applied to the example embodiments, it will be understood that various omissions and substitutions and changes in the form and details of devices illustrated, and in their operation, may be made by those skilled in the art without departing from the spirit of the present disclosure. Moreover, it is expressly intended that all combinations of those elements and/or method operations, which perform substantially the same function in substantially the same way to achieve the same results, are within the scope of the present disclosure. Moreover, it should be recognized that structures and/or elements and/or method operations shown and/or described in connection with any disclosed form or embodiment of the present disclosure may be incorporated in any other disclosed or described or suggested form or embodiment as a general matter of design choice. It is the intention, therefore, to be limited only as indicated by the scope of the claimed invention.

EXAMPLES

One example may be a method including the operations of receiving, by a first device, one or more fine timing measurement (FTM) requests, transmitting, by the first device, a service discovery frame (SDF) indicating an intent to respond to the one or more fine timing measurement (FTM) requests, transitioning, by the first device, to a channel to perform a FTM flow, and receiving, by the first device, one or more FTM frames sent by one or more devices. The SDF may include information including a channel to perform FTM in, and a time and/or duration of FTM window. The first device may be configured to limit a set of target devices for FTM by publishing a set of target devices for FTM. If the first device may be not a requesting device, at least one of the one or more devices transmits an FTM request to initiate a FTM flow. The target devices may be identified by a Service Set ID (SSID), a Medium Access Controller (MAC) address, a Neighbor Awareness Networking (NAN) device ID, or a NAN Cluster Basic Service Set ID (BSSID). The two or more devices may be connected via a Wi-Fi network, IEEE 802.11 network, Social Wi-Fi network, or may be a part of a Neighbor-Awareness Networking (NAN) cluster.

Another example may be a device including a wireless controller configured to communicate with one or more devices, a non-transitory computer readable storage device including instructions stored thereon, and one or more processor(s) to execute the instructions stored on the storage device, causing the device to perform operations of receiving one or more fine timing measurement (FTM) requests, transmitting, by the wireless controller coupled to the one or more processor(s), a service discovery frame (SDF) indicating an intent to respond to the one or more fine timing measurement (FTM) requests, and transitioning, by the device, to a channel to perform a FTM flow. The SDF may include information including a channel to perform FTM in, and a time and/or duration of FTM window. The device may be configured to limit a set of target devices for FTM by publishing a set of target devices for FTM. If the device may be not a requesting device, at least one of the one or more devices transmits an FTM request to initiate a FTM flow. The target devices may be identified by a Service Set ID (SSID), a Medium Access Controller (MAC) address, a Neighbor Awareness Networking (NAN) device ID, or a NAN Cluster Basic Service Set ID (BSSID). The device and the one or more devices may be connected via a Wi-Fi network, IEEE 802.11 network, Social Wi-Fi network, or may be a part of a Neighbor-Awareness Networking (NAN) cluster.

Another example may be a non-transitory computer readable storage device including instructions stored thereon, which when executed by one or more processor(s) of a first mobile device, cause the first mobile device to perform operations of receiving one or more fine timing measurement (FTM) requests, transmitting a service discovery frame (SDF) indicating an intent to respond to the one or more fine timing measurement (FTM) requests, and transitioning, by the first mobile device, to a channel to perform a FTM flow. The SDF may include information including a channel to perform FTM in, and a time and/or duration of FTM window. The device may be configured to limit a set of target devices for FTM by publishing a set of target devices for FTM. If the device may be not a requesting device, at least one of the one or more devices transmits an FTM request to initiate a FTM flow. The target devices may be identified by a Service Set ID (SSID), a Medium Access Controller (MAC) address, a Neighbor Awareness Networking (NAN) device ID, or a NAN Cluster Basic Service Set ID (BSSID). The first mobile device and the one or more mobile devices may be connected via a Wi-Fi network, IEEE 802.11 network, a Social Wi-Fi network, or may be a part of a Neighbor-Awareness Networking (NAN) cluster.

Another example may be a system for communication between two or more devices, the system including a first device for receiving one or more fine timing measurement (FTM) requests and identifying one or more devices that would like to measure proximity to the first device, wherein the first device transmits a service discovery frame (SDF) indicating an intent to respond to the one or more fine timing measurement (FTM) requests, wherein the first device and one or more devices satisfying the service discovery frame transition to a channel requested by the first device to perform a FTM flow, and the one or more devices transmit respective FTM frames to the first device. The first mobile device and the one or more devices may be connected via a Wi-Fi network, IEEE 802.11 network, a Social Wi-Fi network, or may be a part of a Neighbor-Awareness Networking (NAN) cluster. The first device and the one or more devices include a wireless controller, a RF interface, and an antenna.

What is claimed is:
1. A method comprising:
receiving, by a first device, two or more fine timing measurement (FTM) requests from two or more other devices;
transmitting, by the first device, a service discovery frame (SDF) indicating an intent to respond to each of the two or more fine timing measurement (FTM) requests, wherein the SDF comprises information identifying a channel in which to perform FTM and a time and/or duration of an FTM window;
transitioning, by the first device, to the channel to perform a FTM flow; and
receiving, by the first device, two or more FTM frames sent by the two or more other devices.
2. The method according to claim 1, wherein the first device is configured to limit a set of target devices for FTM by publishing a set of target devices for FTM.
3. The method according to claim 1, wherein if the first device is not a requesting device, at least one of the two or more other devices transmits an FTM request to initiate a FTM flow.

4. The method according to claim 2, wherein the target devices are identified by a Service Set ID (SSID), a Medium Access Controller (MAC) address, a Neighbor Awareness Networking (NAN) device ID, or a NAN Cluster Basic Service Set ID (BSSID).

5. The method according to claim 1, wherein the two or more other devices are connected via a Wi-Fi network, IEEE 802.11 network, Social Wi-Fi network, or are a part of a Neighbor-Awareness Networking (NAN) cluster.

6. A device comprising:
a wireless controller configured to communicate with two or more other devices;
a non-transitory computer readable storage device including instructions stored thereon; and
one or more processor(s) to execute the instructions stored on the storage device, causing the device to perform operations of:
receiving two or more fine timing measurement (FTM) requests from the two or more other devices;
transmitting, by the wireless controller coupled to the one or more processor(s), a service discovery frame (SDF) indicating an intent to respond to each of the two or more fine timing measurement (FTM) requests, wherein the SDF comprises information identifying a channel in which to perform FTM and a time and/or duration to perform the FTM; and
transitioning, by the device, to the channel to perform a FTM flow.

7. The device according to claim 6, wherein the device is configured to limit a set of target devices for FTM by publishing a set of target devices for FTM.

8. The device according to claim 6, wherein if the device is not a requesting device, at least one of the two or more other devices transmits an FTM request to initiate a FTM flow.

9. The device according to claim 7, wherein the target devices are identified by a Service Set ID (SSID), a Medium Access Controller (MAC) address, a Neighbor Awareness Networking (NAN) device ID, or a NAN Cluster Basic Service Set ID (BSSID).

10. The device according to claim 6, wherein the device and the two or more devices are connected via a Wi-Fi network, IEEE 802.11 network, Social Wi-Fi network, or are a part of a Neighbor-Awareness Networking (NAN) cluster.

11. A non-transitory computer readable storage device including instructions stored thereon, which when executed by one or more processor(s) of a first mobile device, cause the first mobile device to perform operations of:
receiving two or more fine timing measurement (FTM) requests from two or more other mobile devices;
transmitting a service discovery frame (SDF) indicating an intent to respond to each of the two or more fine timing measurement (FTM) requests, wherein the SDF comprises information identifying a channel in which to perform FTM and a time and/or duration to perform the FTM; and
transitioning, by the first mobile device, to the channel to perform a FTM flow.

12. The storage device according to claim 11, wherein the device is configured to limit a set of target devices for FTM by publishing a set of target devices for FTM.

13. The storage device according to claim 11, wherein if the device is not a requesting device, at least one of the two or more other mobile devices transmits an FTM request to initiate a FTM flow.

14. The storage device according to claim 12, wherein the target devices are identified by a Service Set ID (SSID), a Medium Access Controller (MAC) address, a Neighbor Awareness Networking (NAN) device ID, or a NAN Cluster Basic Service Set ID (BSSID).

15. The storage device according to claim 11, wherein the first mobile device and the one or more mobile devices are connected via a Wi-Fi network, IEEE 802.11 network, a Social Wi-Fi network, or are a part of a Neighbor-Awareness Networking (NAN) cluster.

16. A system for communication between two or more devices, the system comprising:
a first device for receiving two or more fine timing measurement (FTM) requests and identifying at least a second device and third device that would like to measure proximity to the first device;
wherein the first device transmits a service discovery frame (SDF) indicating an intent to respond to each of the two or more fine timing measurement (FTM) requests,
wherein the SDF comprises information identifying a channel in which to perform FTM and a time and/or duration to perform the FTM, and
wherein the first device and the at least the second device and third device satisfy the service discovery frame transition to the channel requested by the first device to perform a FTM flow.

17. The system according to claim 16, wherein the first mobile device and the at least the second device and the third device are connected via a Wi-Fi network, IEEE 802.11 network, a Social Wi-Fi network, or are a part of a Neighbor-Awareness Networking (NAN) cluster.

18. The system according to claim 16, wherein the first device and the at least the second device and the third device comprise a wireless controller, a RF interface, and an antenna.

* * * * *